(12) United States Patent
Aflaki Beni

(10) Patent No.: US 11,330,295 B2
(45) Date of Patent: May 10, 2022

(54) DETERMINING INTER-VIEW PREDICTION AREAS IN IMAGES CAPTURED WITH A MULTI-CAMERA DEVICE

(71) Applicant: Nokia Technologies Oy, Espoo (FI)

(72) Inventor: Payman Aflaki Beni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 45 days.

(21) Appl. No.: 16/326,778

(22) PCT Filed: Aug. 17, 2017

(86) PCT No.: PCT/IB2017/055005
§ 371 (c)(1),
(2) Date: Feb. 20, 2019

(87) PCT Pub. No.: WO2018/042280
PCT Pub. Date: Mar. 8, 2018

(65) Prior Publication Data
US 2019/0238887 A1 Aug. 1, 2019

(30) Foreign Application Priority Data
Sep. 1, 2016 (GB) .................................. 1614771.2

(51) Int. Cl.
*H04N 19/597* (2014.01)
*H04N 19/105* (2014.01)
(Continued)

(52) U.S. Cl.
CPC ....... *H04N 19/583* (2014.11); *H04N 5/23238* (2013.01); *H04N 19/103* (2014.11);
(Continued)

(58) Field of Classification Search
CPC .. H04N 19/597; H04N 19/105; H04N 19/134; H04N 19/17; H04N 19/52;
(Continued)

(56) References Cited

U.S. PATENT DOCUMENTS 7,623,682 B2 11/2009 Park et al.
8,204,133 B2 6/2012 Cho et al.
(Continued)

FOREIGN PATENT DOCUMENTS

WO 2006/080739 A1 8/2006
WO 2008/023967 A1 2/2008
(Continued)

OTHER PUBLICATIONS

Extended European Search Report received for corresponding European Patent Application No. 17845608.3, dated Mar. 30, 2020, 8 pages.
(Continued)

*Primary Examiner* — Robert J Hance
(74) *Attorney, Agent, or Firm* — Alston & Bird LLP

(57) ABSTRACT

An apparatus comprising a multi-camera device including at least two cameras and a controller for receiving image data from the cameras, determining which areas of the images to enable for inter-view prediction, wherein the determination is based on imaging characteristics of the cameras and relative locations and orientations of the cameras within the multi-camera device, and enabling inter-view prediction for the determined areas of the images.

20 Claims, 5 Drawing Sheets

(51) Int. Cl.

| | | |
|---|---|---|
| *H04N 19/17* | (2014.01) | |
| *H04N 19/583* | (2014.01) | |
| *H04N 5/232* | (2006.01) | |
| *H04N 19/103* | (2014.01) | |
| *H04N 19/134* | (2014.01) | |
| *H04N 7/18* | (2006.01) | |
| *H04N 5/247* | (2006.01) | |

(52) U.S. Cl.
CPC ......... *H04N 19/105* (2014.11); *H04N 19/134* (2014.11); *H04N 19/17* (2014.11); *H04N 19/597* (2014.11); *H04N 5/247* (2013.01); *H04N 7/18* (2013.01)

(58) Field of Classification Search
CPC ...... H04N 7/18; H04N 19/103; H04N 19/583; H04N 5/247; G06T 2207/10016; G06T 7/55

See application file for complete search history.

(56) References Cited

U.S. PATENT DOCUMENTS

| | | | |
|---|---|---|---|
| 8,654,843 B2 * | 2/2014 | Onno | H04N 19/177 375/240.12 |
| 8,810,633 B2 | 8/2014 | Leung et al. | |
| 9,253,486 B2 | 2/2016 | Tian et al. | |
| 2006/0034374 A1 | 2/2006 | Park et al. | |
| 2008/0095231 A1 * | 4/2008 | Onno | H04N 19/597 375/240.12 |
| 2010/0020870 A1 | 1/2010 | Jeon et al. | |
| 2010/0074334 A1 | 3/2010 | Jeon et al. | |
| 2010/0271511 A1 * | 10/2010 | Ma | H04N 13/261 348/239 |
| 2011/0128353 A1 * | 6/2011 | Leung | H04N 19/395 348/47 |
| 2011/0202575 A1 * | 8/2011 | Frojdh | H04N 21/8126 707/803 |
| 2012/0314027 A1 * | 12/2012 | Tian | H04N 19/172 348/43 |
| 2013/0258052 A1 * | 10/2013 | Li | H04N 13/161 348/43 |
| 2014/0198976 A1 * | 7/2014 | Coffman | G06T 7/593 382/154 |
| 2015/0063450 A1 | 3/2015 | Kim et al. | |
| 2016/0057441 A1 * | 2/2016 | Skupin | H04N 19/52 375/240.25 |
| 2016/0191759 A1 * | 6/2016 | Somanath | H04N 13/25 348/349 |
| 2017/0287107 A1 * | 10/2017 | Forutanpour | G06T 3/0062 |

FOREIGN PATENT DOCUMENTS

| | | | | |
|---|---|---|---|---|
| WO | WO-2013068491 A1 * | 5/2013 | ........... | H04N 19/597 |
| WO | WO-2014166964 A1 * | 10/2014 | ............ | H04N 19/55 |

OTHER PUBLICATIONS

Colonnese et al., "On the Adoption of Multiview Video Coding in Wireless Multimedia Sensor Networks", 2011 Wireless Advanced, Jun. 20-22, 2011, pp. 218-223.

Chun et al., "An Enhanced Multi-View Video Compression Using the Constrained Inter-View Prediction", Proceedings of the 2009 ACM Symposium on Applied Computing (SAC), 2009, pp. 1811-1815.

Wang et al., "A Spatial Correlation-Based Image Compression Framework for Wireless Multimedia Sensor Networks", IEEE Transactions on Multimedia, vol. 13, No. 2, Apr. 2011, pp. 388-401.

"LG 360 Cam Full review. Is it good? Is it worth $199?", YouTube, Retrieved on Jan. 31, 2019, Webpage available at : https://www.youtube.com/watch?v=85OFA9YTvUU.

Schafer et al., "Interactive Streaming of Panoramas and VR Worlds", IBC, 2015, 8 pages.

Search Report received for corresponding United Kingdom Patent Application No. 1614771.2, dated Jan. 10, 2017, 4 pages.

International Search Report and Written Opinion received for corresponding Patent Cooperation Treaty Application No. PCT/IB2017/055005, dated Dec. 14, 2017, 12 pages.

Domanski et al., "Methods of High Efficiency Compression for Transmission of Spatial Representation of Motion Scenes", IEEE International Conference on Multimedia & Expo Workshops (ICMEW), 2015, 4 pages.

Youvalari, "360-Degree Panoramic Video Coding", Thesis, Jan. 13, 2016, 68 pages.

Ridge et al., "Virtual Reality Requirements for Future Video Coding", ITU—Telecommunications Standardization Sector Study Group 16 Question 6 Video Coding Experts Group (VCEG), VCEG-BA07, Feb. 20-26, 2016, 4 pages.

* cited by examiner

DETERMINING INTER-VIEW PREDICTION AREAS IN IMAGES CAPTURED WITH A MULTI-CAMERA DEVICE

RELATED APPLICATION

This application was originally filed as Patent Cooperation Treaty Application No. PCT/IB2017/055005 filed Aug. 17, 2017 which claims priority benefit to GB Patent Application No. 1614771.2, filed Sep. 1, 2016.

FIELD

This specification relates generally to determining the position of inter-view prediction areas in 360 degree content.

BACKGROUND

In Multiview video coding, the scene is captured from more than one viewing direction by multiple cameras. This often leads to large amounts of overlap and redundancy between adjacent images in the Multiview. Inter-view prediction is the process of using the content of one view as a reference image for encoding the content of the other images more efficiently.

SUMMARY

In a first aspect, this specification describes an apparatus comprising a multi-camera device including at least a first image capturing device and a second image capturing device and a controller configured to receive image data from the multi-camera device including a first image captured by the first image capture device and a second image captured by the second image capture device, determine an area of the first and second images to enable for inter-view prediction, wherein the determination is based on imaging characteristics of the first and second image capture devices and relative locations and orientations of the first and second image capture devices within the multi-camera device, and enable inter-view prediction for the determined areas of the first and second images.

The multi-camera device may be configured to capture a 360 degree view.

The apparatus may be further configured to determine at least one area of overlap between the first image and the second image, wherein the determination is based on imaging characteristics of each of the first and second image capturing devices and the relative locations and orientations of the first and second image capturing devices within the multi-camera device. The determined areas for inter-view prediction for the first image and the second image may be at least partly outside of the at least one area of overlap. The area enabled for inter-view prediction for the first image and the second image may be wholly outside of the area of overlap. The determined area of the first image for inter-view prediction and the determined area of the second image for inter-view prediction may be located on opposing sides of the first and second images respectively.

The controller may be integrated with the multi-camera device. The imaging characteristics of the first and second image capturing devices may comprise an angle of view. The imaging characteristics of the first and second image capturing devices may comprise a resolution.

The apparatus may further comprise an encoder, wherein the controller may be configured to send image data to the encoder and wherein the encoder may be configured to encode the first and second images using inter-view prediction for the areas enabled for inter-view prediction in each image. The first image may be designated as a reference frame and the image data of the reference frame may be sent to the encoder. The second image may be designated as a dependent frame and the image data required to encode the dependent frame using inter-view prediction may be sent to the encoder. The apparatus may further comprise a transceiver configured to transmit the encoded data over a wired or wireless network.

The multi-camera device may be configured to capture a two dimensional 360 degree image. Alternatively or in addition, the multi-camera device may be configured to capture a three dimensional stereoscopic 360 degree image. Alternatively or in addition, the multi-camera device may be configured to capture a three dimensional image comprising a texture image and a depth map.

The multi-camera device may comprise two image capturing devices orientated 180 degrees from each other in at least a first plane, wherein each of the two image capturing devices has a field of view of more than 180 degrees in at least the first plane so as to create the area of overlap between the first image and the second image. The controller may be configured to enable inter-view prediction for areas on both sides of the first and second images.

The apparatus may be a mobile phone.

In a second aspect, this specification describes a method comprising receiving image data from a multi-camera device, the multi-camera device including at least a first image capturing device and a second image capturing device, wherein the image data comprises a first image captured by the first image capturing device and a second image captured by the second image capturing device, determining an area of each of the first and second images to enable for inter-view prediction, wherein the determination is based on imaging characteristics of each of the first and second image capturing devices and the relative locations and orientations of the first and second image capturing devices within the multi-camera device, and enabling inter-view prediction for the determined areas of each of the first and second images.

The method may further comprise capturing a 360 degree view.

The method may further comprise determining at least one area of overlap between the first image and the second image, wherein the determination is based on imaging characteristics of each of the first and second image capturing devices and the relative locations and orientations of the first and second image capturing devices within the multi-camera device. The determined areas for inter-view prediction for the first image and the second image may be at least partly outside of the at least one area of overlap. The area enabled for inter-view prediction for the first image and the second image may be wholly outside of the area of overlap. The determined area of the first image for inter-view prediction and the determined area of the second image for inter-view prediction may be located on opposing sides of the first and second images respectively.

The imaging characteristics of the first and second image capturing devices may comprise an angle of view. The imaging characteristics of the first and second image capturing devices may comprise a resolution.

The method may further comprise sending image data to an encoder and encoding the first and second images using inter-view prediction for the areas enabled for inter-view prediction in each image. The first image may be designated as a reference frame and the method may further comprise sending image data of the reference frame to the encoder. The second image may be designated as a dependent frame and the method may further comprise sending image data required to encode the dependent frame using inter-view prediction to the encoder. The method may further comprise transmitting the encoded data over a wired or wireless network using a transceiver.

The method may further comprise capturing a two dimensional 360 degree image. Alternatively or in addition, the method may further comprise capturing a three dimensional stereoscopic 360 degree image. Alternatively or in addition, the method may further comprise capturing a three dimensional image comprising a texture image and a depth map.

The multi-camera device may comprise two image capturing devices orientated 180 degrees from each other in at least a first plane, wherein each of the two image capturing devices has a field of view of more than 180 degrees in at least the first plane so as to create the area of overlap between the first image and the second image. The method may further comprise enabling inter-view prediction for areas on both sides of the first and second images.

The method may be performed by a mobile phone.

In a third aspect, this specification describes computer-readable instructions which, when executed by computing apparatus, cause the computing apparatus to perform any method as described with reference to the second aspect.

In a fourth aspect, this specification describes apparatus comprising at least one processor and at least one memory including computer program code, which when executed by the at least one processor, causes the apparatus to receive image data from a multi-camera device, the multi-camera device including at least a first image capturing device and a second image capturing device, wherein the image data comprises a first image captured by the first image capturing device and a second image captured by the second image capturing device, determine an area of each of the first and second images to enable for inter-view prediction, wherein the determination is based on imaging characteristics of each of the first and second image capturing devices and the relative locations and orientations of the first and second image capturing devices within the multi-camera device, and enable inter-view prediction for the determined areas of each of the first and second images.

In a fifth aspect, this specification describes a computer-readable medium having computer-readable code stored thereon, the computer readable code, when executed by a least one processor, causes performance of at least: receiving image data from a multi-camera device, the multi-camera device including at least a first image capturing device and a second image capturing device, wherein the image data comprises a first image captured by the first image capturing device and a second image captured by the second image capturing device; determining an area of each of the first and second images to enable for inter-view prediction, wherein the determination is based on imaging characteristics of each of the first and second image capturing devices and the relative locations and orientations of the first and second image capturing devices within the multi-camera device; and enabling inter-view prediction for the determined areas of each of the first and second images.

In a sixth aspect, this specification describes apparatus comprising means for receiving image data from a multi-camera device, the multi-camera device including at least a first image capturing device and a second image capturing device, wherein the image data comprises a first image captured by the first image capturing device and a second image captured by the second image capturing device; means for determining an area of each of the first and second images to enable for inter-view prediction, wherein the determination is based on imaging characteristics of each of the first and second image capturing devices and the relative locations and orientations of the first and second image capturing devices within the multi-camera device; and means for enabling inter-view prediction for the determined areas of each of the first and second images.

BRIEF DESCRIPTION OF THE FIGURES

For a more complete understanding of the methods, apparatuses and computer-readable instructions described herein, reference is now made to the following descriptions taken in connection with the accompanying drawings in which.

DETAILED DESCRIPTION

Figure 1:
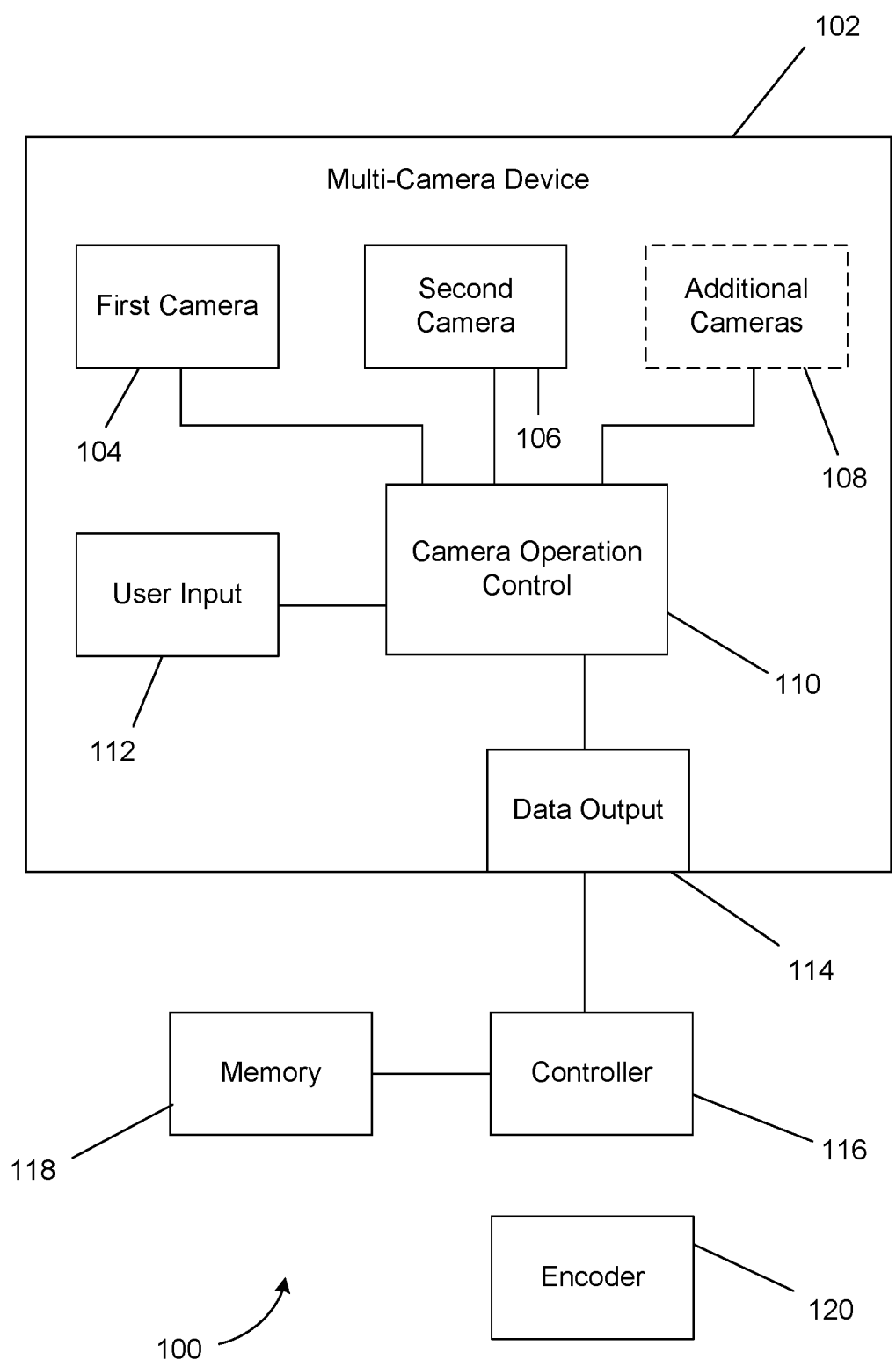
FIG. 1 is a schematic illustration of an apparatus for determining areas to enable for inter-view prediction according to some embodiments.

In the description and drawings, like reference numerals may refer to like elements throughout. In Multiview video coding, a scene is captured from more than one viewing direction and hence, there is often redundancy between the images where the views overlap. Such redundancies can be taken into account to increase the level of data compression and decrease the bitrate required to transmit the content while preserving quality of the images.

The images which make up a Multiview image represent different projections of the same real world scene, which are synchronously captured with multiple cameras which are located separately from each other. The content of one view can be used as a reference for the other views meaning that when one view is available in the encoder side, this view can be used in the inter-prediction process to code the other view(s) more efficiently. Such inter-view prediction decreases the bitrate required to encode the other view(s). One contributor to the amount of difference between the content of two views in a Multiview image is how far objects are from the camera. The closer the objects, the more the difference in placement of those objects in different views will be.

Inter-view prediction is used to take into account the available redundancies between two views which have been captured of the same scene at the same time. This technique uses the fact that two images are captured of the same content at the same time from slightly different viewing directions. In many Multiview image systems, there is a very large amount of overlap between adjacent images, and so typically inter-view prediction is enabled over the entire image(s). Such systems are inefficient, particularly where the resulting images need to be encoded and transmitted.

Images originating from a plurality of different cameras may be stitched together to form one 360° panoramic image. Photo stitching includes the process of perspective warping of images to align them perfectly. Therefore, the perspectives of the images are changed in order to blend them together. Several related image processing algorithms may be used in the process of image stitching including: template matching, keypoints matching, corner detection, feature transform and utilization of image gradients. However, the conventional algorithms for 360° content creation do not use inter-view prediction and are thus very data intensive to encode.

Head Mounted Displays (HMDs) and virtual reality systems are becoming more useful and widespread. In the future, users will expect to be able to stream high resolution content in 360 degree format. Current and future broadcasting infrastructure may not be able to transmit the large amount of data required in real time. Therefore, it is required to further decrease the required transmission bitrate in order to enable broadcasting of such data.

FIG. 1 is a schematic illustration of an apparatus 100 for determining areas to enable for inter-view prediction. The apparatus 100 comprises a Multiview camera device 102. The Multiview camera device 102 is configured to capture image content using multiple cameras. The Multiview camera device 102 comprises a first camera 104 (also referred to herein as a first image capturing device) and a second camera 106 (also referred to herein as a second image capturing device). The Multiview camera device 102 may also comprise one or more additional cameras 108, for example the Multiview camera device 102 may comprise three, four or more cameras in total. The cameras 104, 106, 108 are together positioned and orientated so as to capture a multi-image view of the scene. In some embodiments, the multi-image view is a 360 degree view of the scene. For example, in embodiments in which only the first camera 104 and second camera 106 are present, the two cameras are orientated 180 degrees apart. Each camera has a viewing angle of 180 degrees or more than 180 degrees (in both the horizontal and vertical directions) in order to capture the whole 360 degree view.

The Multiview camera device 102 also comprises a camera operation control module 110. The camera operation control module 110 may comprise any suitable combination of software and hardware, such as a microprocessor, RAM and non-volatile memory. The camera operation control module 110 controls each of the cameras 104, 106, 108 to capture images and may also control the focus, ISO levels and other imaging parameters of each camera.

The Multiview camera device 102 may comprise one or more user inputs 112. For example, the user inputs 112 may allow a user to turn the Multiview camera device 102 on and off and to issue commands to capture images or stop capturing images. The user inputs 112 may also allow the user to selectively enable and disable some of the cameras of the Multiview camera device 102, such that only some of the cameras are enabled at any one time. These use inputs may be accessible on an outer housing of the Multiview camera device 102. The user input 112 may be in the form of an interface or port to allow the Multiview camera device 102 to be connected to and controlled by an external apparatus. For example, the user input 112 may be a USB port or similar or a wireless transceiver. In some embodiments, a user may control the Multiview camera device 102 using an external computing device via one or more of the user inputs 112.

The Multiview camera device 102 also comprises data output hardware 114. This may take the form of an interface or port to facilitate communication with an external device. In some embodiments, the data output 114 and the user input 112 share the same port. The camera operation control module 110 is configured to receive the image data captured by the cameras 104, 106, 108 and to control the data output hardware 114 to send the image data to another controller for image processing.

The apparatus 100 comprises a controller 116, a memory 118 and an encoder 120. The controller 116 is configured to perform image analysis on the images captured by the Multiview camera device 102. Executable software is stored in the memory 118. The memory 118 also stores information about the cameras 104, 106, 108 in the Multiview camera device 102, including the relative position and orientation of each camera and the field of view (or "viewing angle") of each camera. The memory 118 may also store information on the resolution of each camera and other characteristics and parameters associated with each camera. The controller 116 is configured to execute the software in the memory 118 and to use the information about the cameras to determine an area of each of the images captured by the Multiview camera device 102 to enable for inter-view prediction, as described in greater detail below. Once the areas enabled for inter-view prediction have been determined, the image data may be encoded by the encoder 120 for subsequent transmission.

In FIG. 1, the controller 116 and memory 118 are shown as separate from the Multiview camera device 102. For example, the controller 116 and memory 118 may be part of an external computing device. However, in some other embodiments, both the controller and memory may be integral with the Multiview camera device 102. The encoder 120 is also shown as a separate module, however, the encoded 120 may be integral with the controller 116. In some other embodiments, the controller 116 and memory 118 are part of the Multiview camera device 102, but the encoder 120 is part of a separate apparatus.

In an exemplary use scenario, a user instructs the Multiview camera device 102 to capture a 360 degree view of a scene using an external computing device connected through the user input 112. The camera operation control module 110 receives the user instructions and controls the individual cameras 104, 106, 108 to capture images of the scene. The image capture instructions may be to capture a single 360 degree image, a number of images or a video sequence, i.e. a large number of individual 360 images of the scene in succession. The captured images are output via the data output hardware 114 to the controller 116, which may be integral with the Multiview camera device 102. The controller 116 executes software on the memory 118 to determine the areas of each image to enable for inter-view prediction, based on the characteristics of each camera 104, 106, and 108. The controller 116 may then perform the inter-view prediction or output the data to the encoder 120, which performs the inter-view prediction. The amount of data to be encoded for transmission for each 360 degree image is thereby reduced. The encoding bitrate is also reduced by use of the techniques described in this specification.

Figure 2:
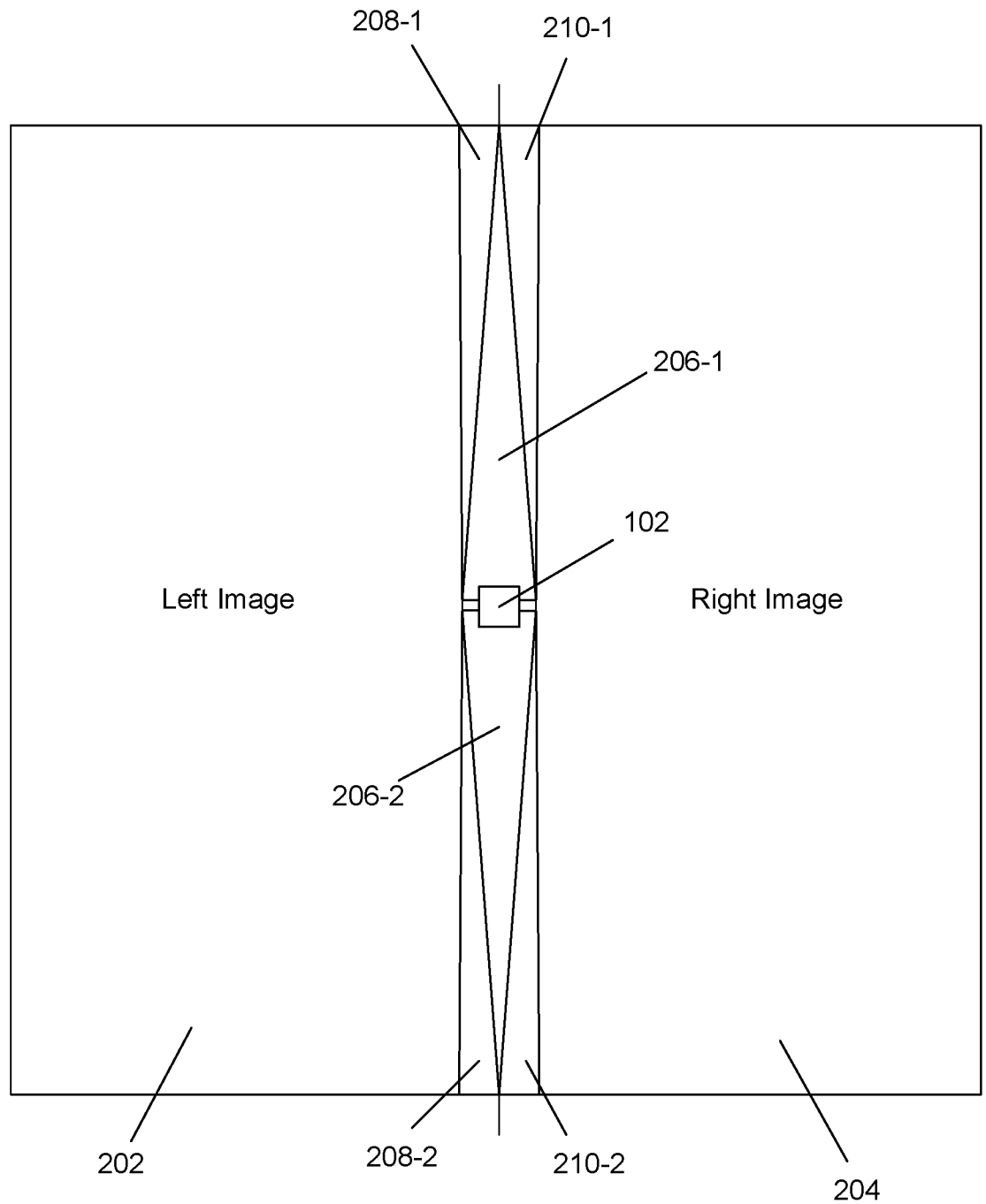
FIGS. 2 and 3 are diagrams showing the viewing zone of a Multiview camera device having two cameras, and illustrating the areas enabled for inter-view prediction.
Figure 3:
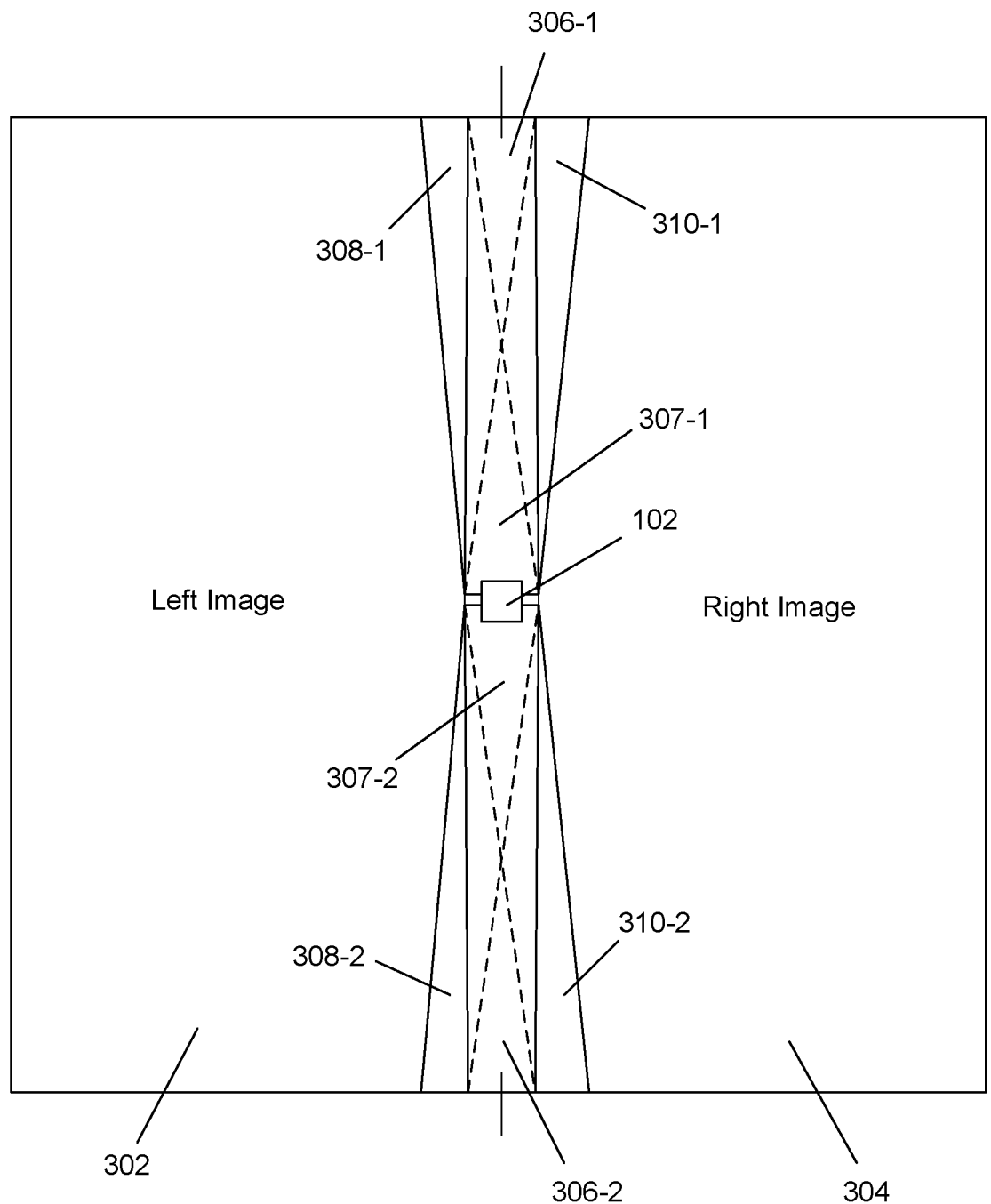

FIGS. 2 and 3 are diagrams showing the viewing zone of a Multiview camera device 102 having a first camera 104 and a second camera 106, and illustrating the areas enabled for inter-view prediction. The Multiview camera device 102 may be specifically designed for capturing Multiview images, such as Nokia's OZO device. However, handheld devices, such as mobile phones and tablets also have the capability to be used as Multiview capture devices. Mobile devices such as these may also be provided with dual cameras to allow them to capture 3D stereoscopic images.

Referring firstly to FIG. 2, the Multiview camera device 102 is configured to capture a 360 degree view using two cameras. The view in FIG. 2 is a two dimensional plan view showing only one plane through the Multiview camera device 102. This plane may be denoted the central horizontal plane as it is parallel with the ground and passes through the centre of each camera lens. The two images captured by the two cameras of the Multiview camera device 102 are here denoted as a left image 202 and a right image 204. These may also be referred to as a right hemisphere 202 and a left hemisphere 204.

In the embodiment of FIG. 2, each of the two cameras has a field of view of 180 degrees, or slightly more than 180 degrees, such that there is no overlap in the content of the left and right images of the scene in the central horizontal plane depicted. In some embodiments, the field of view of each camera may be adjustable by a user of the system, and the user may adjust the field of view so that there is no overlap in content between the left and right images in the central horizontal plane. This arrangement results in a first blind spot area 206-1 and a second blind spot area 206-2. Where the content being captured is a two dimensional 360 degree image (i.e. an image which can be projected onto the inside of a virtual sphere or space) then this does not result in any area having no image data. It is only when the Multiview camera device 102 is being used to capture three dimensional 360 degree images that any blind spot exists. Any objects in the blind spots 206-1 and 206-2 will not be captured. The extent of the blind spots 206-1, 206-2 has been exaggerated in FIG. 2 in order to more clearly illustrate the concepts. In practice, any blind spot may be much narrower.

Information describing the exact position and orientation of each of the two cameras within the Multiview camera device 102 is stored in the memory 118. Information describing the field of view of each camera is also stored in the memory 118. When the controller 116 receives the image data captured by the Multiview camera device 102, it executes software for determining areas to enable for inter-view prediction and uses this information in making the determination. A first area 208-1 is enabled at the right edge of the left image 202 and a second area 208-2 is enabled at the left edge of the left image 202. Similarly, a first area 210-1 is enabled at the left edge of the right image 204 and a second area 210-2 is enabled at the right edge of the right image 204.

Referring now to FIG. 3 a more general case is shown. Again, the Multiview camera device 102 is configured to capture a 360 degree view using two cameras. The view in FIG. 3 is a two dimensional plan view showing only one plane through the Multiview camera device 102. This plane may be denoted the central horizontal plane as it is parallel with the ground and passes through the centre of each camera lens. The two images captured by the two cameras of the Multiview camera device 102 are again denoted as a left image 302 and a right image 304. These may also be referred to as a right hemisphere 302 and a left hemisphere 304.

In the embodiment of FIG. 3, each of the two cameras has a field of view of more than 180 degrees, such that there is an overlap in the content of the left and right images of the scene. For example, each camera may employ a fish-eye lens to achieve greater than 180 degree view angle. As with the embodiment of FIG. 2, the field of view of each camera may be adjustable by a user of the system, and the user may adjust the field of view so that there is a particular amount of overlap in content between the left and right images.

This arrangement results in a first overlap area 306-1 and a second overlap area 306-2. The arrangement also produces a first blind spot 307-1 and a second blind spot 307-2. Due to the greater angle of view of the camera, the blind spots 307-1, 307-2 are smaller than in the embodiments depicted in FIG. 2. Where the content being captured is a two dimensional 360 degree image (i.e. an image which can be projected onto the inside of a virtual sphere or space) then the first and second blind spots 307-1, 307-2 do not result in any part of the 360 degree view having no image data. It is only when the Multiview camera device 102 is being used to capture three dimensional 360 degree images that any blind spot exists. Any objects located close to the Multiview camera device 102 in the blind spots 307-1 and 307-2 will not be captured. Again, the extent of the blind spots 307-1, 307-2 has been exaggerated in FIG. 3 in order to more clearly illustrate the concepts. In practice, any blind spot may be much narrower.

The controller is configured to determine the extent of the first and second areas of overlap 306-1, 306-2 (or the point at which the left and right images would begin to overlap in the case of the embodiment of FIG. 2). The controller may be configured to do this without analysing the image data itself, but by using the information on the position and orientation of the cameras and the field of view of the cameras stored in the memory 118. The controller then determines the areas of each of the left and right images 302, 304 to enable for inter-view prediction, this determination being based on the imaging characteristics of each of the first and second cameras and the relative locations and orientations of the first and second cameras within the Multiview camera device 102. For example, the controller 116 may enable a first area 308-1 on the right side of the left image 302 and a second area 308-2 on the left side of the left image 302. Similarly, the controller 116 may enable a first area 310-1 on the left side of the right image 304 and a second area 310-2 on the right side of the right image 304.

Each of the areas enabled for inter-view prediction (308-1, 308-2, 310-1, 310-2) may begin at the point where the overlap areas 306-1, 306-2 end. In other words, the areas enabled for inter-view prediction may be wholly outside of the areas of overlap. The angular size of the areas enabled for inter-view prediction (308-1, 308-2, 310-1, 310-2) may be unrelated to the size of the overlap areas 306-1, 306-2 and may be chosen to provide a given image quality for a given encoding scheme. For example, the way in which the complete images will be encoded for transmission may affect the angular size of the areas enabled for inter-view prediction. In some other embodiments, the areas enabled for inter-view prediction (308-1, 308-2, 310-1, 310-2) may include portions of the overlapping areas 306-1, 306-2 or all of these areas. For example, the areas enabled for inter-view prediction (308-1, 308-2, 310-1, 310-2) may comprise a predetermined fraction of the overlapping areas, such as 25%, 50%, 75% or 100%.

The Multiview camera device 102 may be configured to capture a two dimensional Multiview image, or a three dimensional Multiview image. In the case where a 3D image is created, each camera 104, 106, 108 may comprise a stereoscopic camera. Alternatively or in addition, the Multiview camera device 102 may be configured to capture one texture image and a respective depth map. The method of determining the area to enable for inter-view prediction is therefore performed on both the texture image and depth map.

Figure 4:
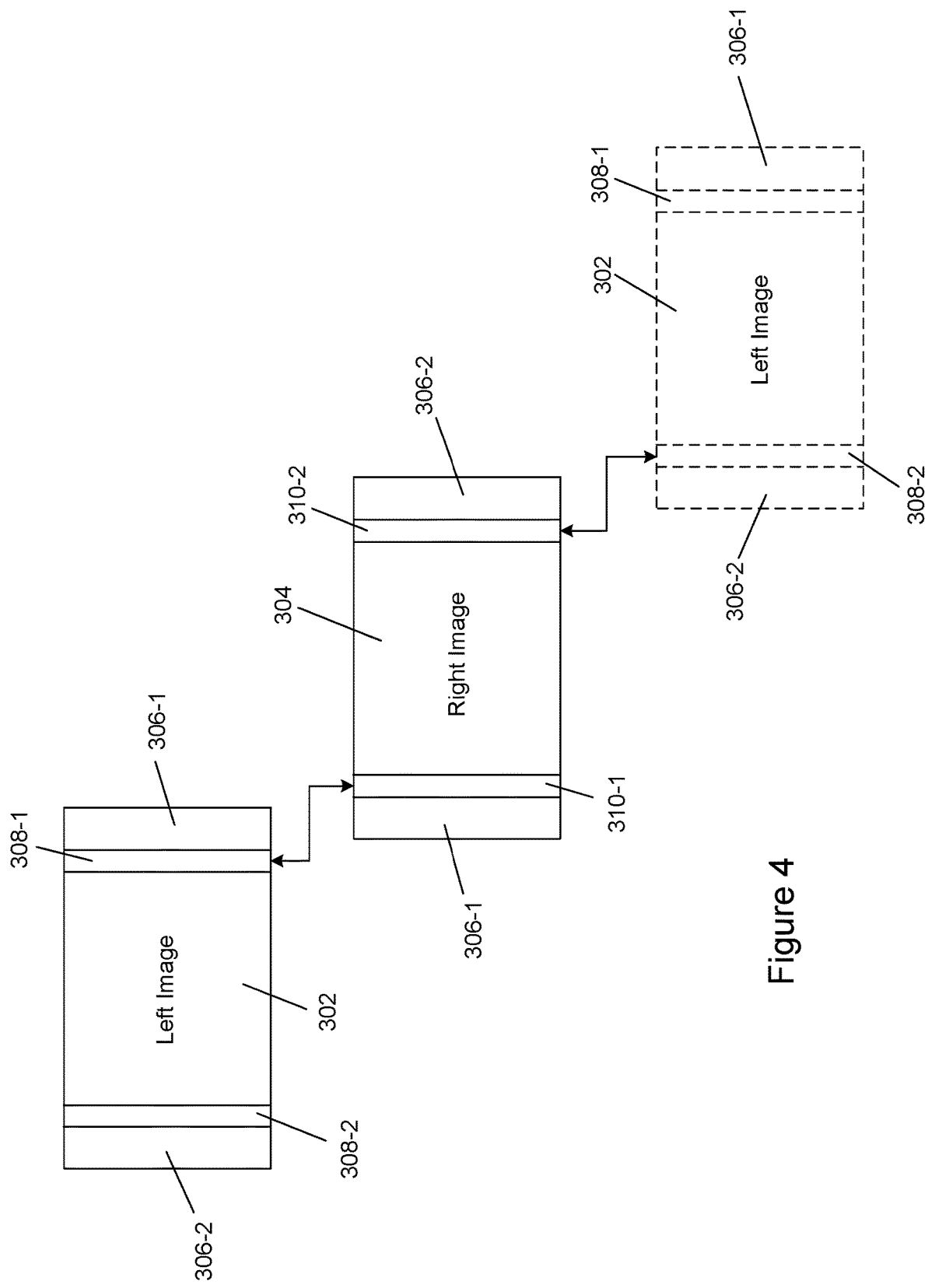
FIG. 4 illustrates how the image data and determined areas relate to the field of view of the two cameras.

FIG. 4 illustrates how the image data and determined areas relate to the field of view of the first and second cameras 104, 106. FIG. 4 relates to the arrangement shown in FIG. 3. The areas at the left and right edges of the left image 302 are the areas of overlap (306-1, 306-2) with the right image. Similarly, the areas at the left and right edges of the right image 304 are the areas of overlap (306-1, 306-2) with the left image. The content of the overlapping areas 306-1, 306-2 is not exactly the same in each of the left and right images, since the scene has been captured by cameras which are located in slightly different positions.

The left image 302 is repeated in FIG. 4 in order to illustrate more clearly the workings of the invention. Inter-view prediction is enabled for a first area 308-1 on the right side of the left image 302. This first area 308-1 is located adjacent to the first area of overlap 306-1 in the left image 302. Similarly, inter-view prediction is enabled for a first area 310-1 on the left side of the right image 304. This first area 310-1 is located adjacent to the first area of overlap 306-1 in the right image 304. Thus the left side of the right image 304 can be inter-view predicted from the enabled area 308-1 on the right side of the left image 302 or the right side of the left image 302 can be inter-view predicted from the enabled area 310-1 on the left side of the right image 304.

In the case where the Multiview camera device 102 comprises two cameras covering the whole 360 degree are, both extreme sides of each image are inter-view predicted from respective opposite enabled areas of the other view. To illustrate this, the left image 302 is repeated in FIG. 4 and the link between the second enabled areas (308-2, 310-2) is each image is shown. The inter-view prediction refers to the opposite horizontal side of the reference or dependent image.

Figure 5:
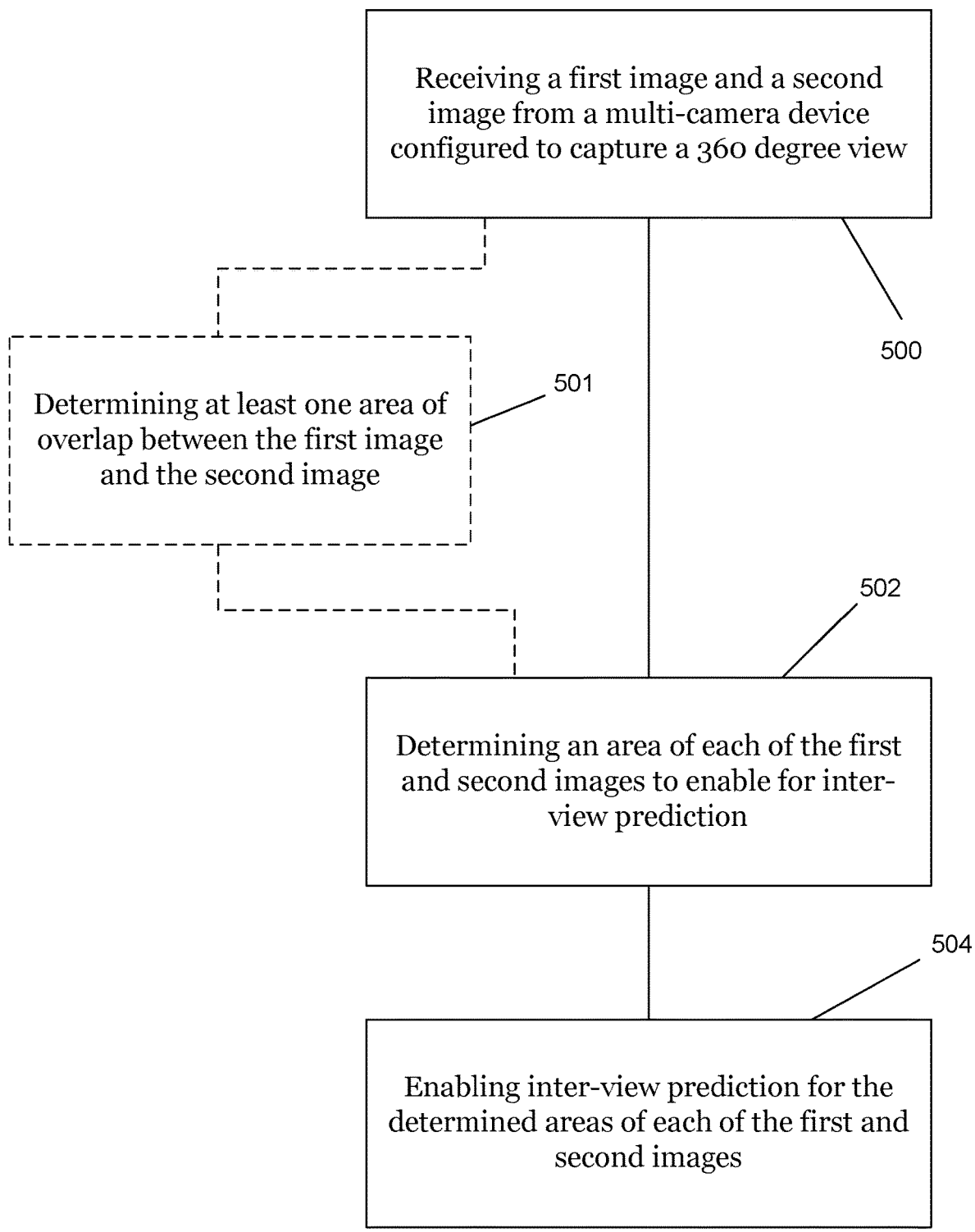
FIG. 5 is a flow chart illustrating exemplary operation of the system according to embodiments.

FIG. 5 is a flow chart illustrating exemplary operation of the system according to embodiments of the invention. At step 500 a controller receives image data in the form of a first image and a second image from a multi-camera device configured to capture a 360 degree view. The multi-camera device includes at least a first image capturing device and a second image capturing device which capture the first and second images respectively.

At step 502 the controller determines an area of each of the first and second images to enable for inter-view prediction. The determination is based on imaging characteristics of each of the first and second image capturing devices and the relative locations and orientations of the first and second image capturing devices within the multi-camera device. The imaging characteristics of each of the first and second image capturing devices may include at least the field of view or angle of view of each camera.

Between steps 500 and 502, an optional step 501 may be performed, in which the controller determines at least one area of overlap between the first image and the second image. This determination is based on imaging characteristics of each of the first and second image capturing devices and the relative locations and orientations of the first and second image capturing devices within the multi-camera device. The imaging characteristics of each of the first and second image capturing devices may include at least the field of view or angle of view of each camera.

At step 504 the controller enables inter-view prediction for the determined areas of each of the first and second images. The areas enabled for inter-view prediction for each image may be wholly outside of the area of overlap or may include part or all of the area of overlap. The controller may also determine the size or angular width of each area enabled for inter-view prediction. The size or angular width of the areas may depend on the required compression rate and/or the encoding regime being used for transmission of the images.

Several optional steps may be performed after the areas to be enabled for inter-view prediction have been defined by the controller. For example, the controller may subsequently perform an inter-view prediction process by defining one image as a reference frame and the other image as a dependent frame and using the image data content of one or more of the areas enabled for inter-view prediction. The controller may then send image data to an encoder for compression and transmission.

Although the invention has been described primarily with reference to a Multiview camera device 102 having two cameras, the skilled person will appreciate that any number of individual cameras could be used, for example three cameras positioned 120 degrees apart and each having a viewing angle of at least 120 degrees in the horizontal direction, or four cameras positioned 90 degrees apart and each having a viewing angle of at least 90 degrees in the horizontal direction.

The controller 116 may be of any suitable composition and may include one or more processors of any suitable type or suitable combination of types. For example, the controller 116 may be a programmable processor that interprets computer program instructions and processes data. The controller 116 may include plural programmable processors. Alternatively, the controller 116 may be, for example, programmable hardware with embedded firmware. The controller 116 may be termed processing means. The controller 116 may alternatively or additionally include one or more Application Specific Integrated Circuits (ASICs). In some instances, controller 116 may be referred to as computing apparatus.

The controller 116 is coupled to the respective memory 118 (or one or more storage devices) and is operable to read/write data to/from the memory 118. The memory 118 may comprise a single memory unit or a plurality of memory units, upon which the computer readable instructions (or code) is stored. For example, the memory 118 may comprise both volatile memory and non-volatile memory. For example, computer readable instructions may be stored in the non-volatile memory and may be executed by the controller 116 using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

Computer readable instructions, in particular instructions for determining areas of the captured images to enable for inter-view prediction, may be pre-programmed into the apparatus 100. Alternatively, the computer readable instructions may arrive at the apparatus 100 via an electromagnetic carrier signal or may be copied from a physical entity such as a computer program product, a memory device or a record medium such as a CD-ROM or DVD. The computer readable instructions may provide the logic and routines that enables the apparatus 100 to perform the functionality described above. The combination of computer-readable instructions stored on memory (of any of the types described above) may be referred to as a computer program product.

Where applicable, wireless communication capability of the apparatus 100 may be provided by a single integrated circuit. It may alternatively be provided by a set of integrated circuits (i.e. a chipset). The wireless communication capability may alternatively be a hardwired, application-specific integrated circuit (ASIC).

As will be appreciated, the apparatus 100 described herein may include various hardware components which may not have been shown in the Figures. Similarly, the apparatus 100 may comprise further optional software components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "controller", "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor and at least one memory comprising computer program code, which when executed by the at least one processor, causes the apparatus to:
receive image data from a multi-camera device, the multi-camera device comprising at least a first image capturing device and a second image capturing device, wherein the image data comprises a first image captured by the first image capturing device and a second image captured by the second image capturing device;
determine an area of the first image and second image to enable for inter-view prediction, wherein the determination is based on imaging characteristics of the first image capturing device and second image capturing device, and relative locations of the first image capturing device and second image capturing device, and orientations of the first image capturing device and second image capturing device within the multi-camera device; and
enable inter-view prediction for the determined areas of each of the first image and the second image.

2. The apparatus according to claim 1, wherein the multi-camera device is configured to capture a 360-degree view.

3. The apparatus according to claim 1, wherein the apparatus is further caused to determine at least one area of overlap between the first image and the second image, wherein the determination is based on imaging characteristics of the first image capturing device and the second image capturing device, the relative location of the first image capturing device and second image capturing device, and orientations of the first image capturing device and second image capturing device within the multi-camera device.

4. The apparatus according to claim 3, wherein the determined areas for the inter-view prediction for the first image and the second image are at least partly outside of the at least one area of overlap.

5. The apparatus according to claim 3, wherein the determined areas for the inter-view prediction for the first image and the second image are outside of the at least one area of overlap.

6. The apparatus according to claim 1, wherein the determined area of the first image for inter-view prediction and the determined area of the second image for inter-view prediction are located on opposing sides of the first image and second images respectively.

7. The apparatus according to claim 1, wherein the imaging characteristics of the first image capturing device and second image capturing device comprises at least one of an angle of view or resolution.

8. The apparatus according to claim 1, wherein the apparatus further caused to encode the first image and second image using the inter-view prediction for the areas enabled for the inter-view prediction.

9. The apparatus according to claim 8, wherein the first image is designated as a reference frame.

10. The apparatus according to claim 9, wherein the second image is designated as a dependent frame.

11. The apparatus according to claim 8, wherein the apparatus further caused to transmit the encoded first image and the second image over a network.

12. The apparatus according to claim 1, wherein the multi-camera device is caused to capture a two-dimensional 360-degree image.

13. The apparatus according to claim 1, wherein the multi-camera device is caused to capture a three-dimensional stereoscopic 360-degree image.

14. The apparatus according to claim 1, wherein the multi-camera device is caused to capture a three-dimensional image comprising a texture image and a depth map.

15. The apparatus according to claim 1, wherein the multi-camera device comprises two image capturing devices orientated 180 degrees from each other in at least a first plane, wherein each of the two image capturing devices has a field of view of more than 180 degrees in at least the first plane to create the area of overlap between the first image and the second image.

16. The apparatus according to claim 1, wherein the apparatus is further caused to enable the inter-view prediction for areas on both sides of the first image and the second image.

17. A method comprising:
    receiving image data from a multi-camera device, the multi-camera device comprising at least a first image capturing device and a second image capturing device, wherein the image data comprises a first image captured by the first image capturing device and a second image captured by the second image capturing device;
    determining an area of the first image and second image to enable for inter-view prediction, wherein the determination is based on imaging characteristics of the first image capturing device and second image capturing device, and relative locations of the first image capturing device and second image capturing device, and orientations of the first image capturing device and second image capturing device within the multi-camera device; and
    enabling the inter-view prediction for the determined areas of each of the first image and the second image.

18. The method according to claim 17, further comprising determining at least one area of overlap between the first image and the second image, wherein the determination is based on imaging characteristics of the first image capturing device and second image capturing device, and the relative location of the first image capturing device and second image capturing device, and orientation of the first image capturing device and second image capturing device within the multi-camera device.

19. The method according to claim 18, wherein the determined areas for inter-view prediction for the first image and the second image are at least partly outside of the at least one area of overlap.

20. A non-transitory computer readable medium comprising program instructions which, when executed by an apparatus, cause the apparatus to perform:
    receive image data from a multi-camera device, the multi-camera device comprising at least a first image capturing device and a second image capturing device, wherein the image data comprises a first image captured by the first image capturing device and a second image captured by the second image capturing device;
    determine an area of the first image and second image to enable for inter-view prediction, wherein the determination is based on imaging characteristics of the first image capturing device and second image capturing device, and relative locations of the first image capturing device and second image capturing device, and orientations of the first image capturing device and second image capturing device within the multi-camera device; and
    enable the inter-view prediction for the determined areas of each of the first image and the second image.

* * * * *